UNITED STATES PATENT OFFICE.

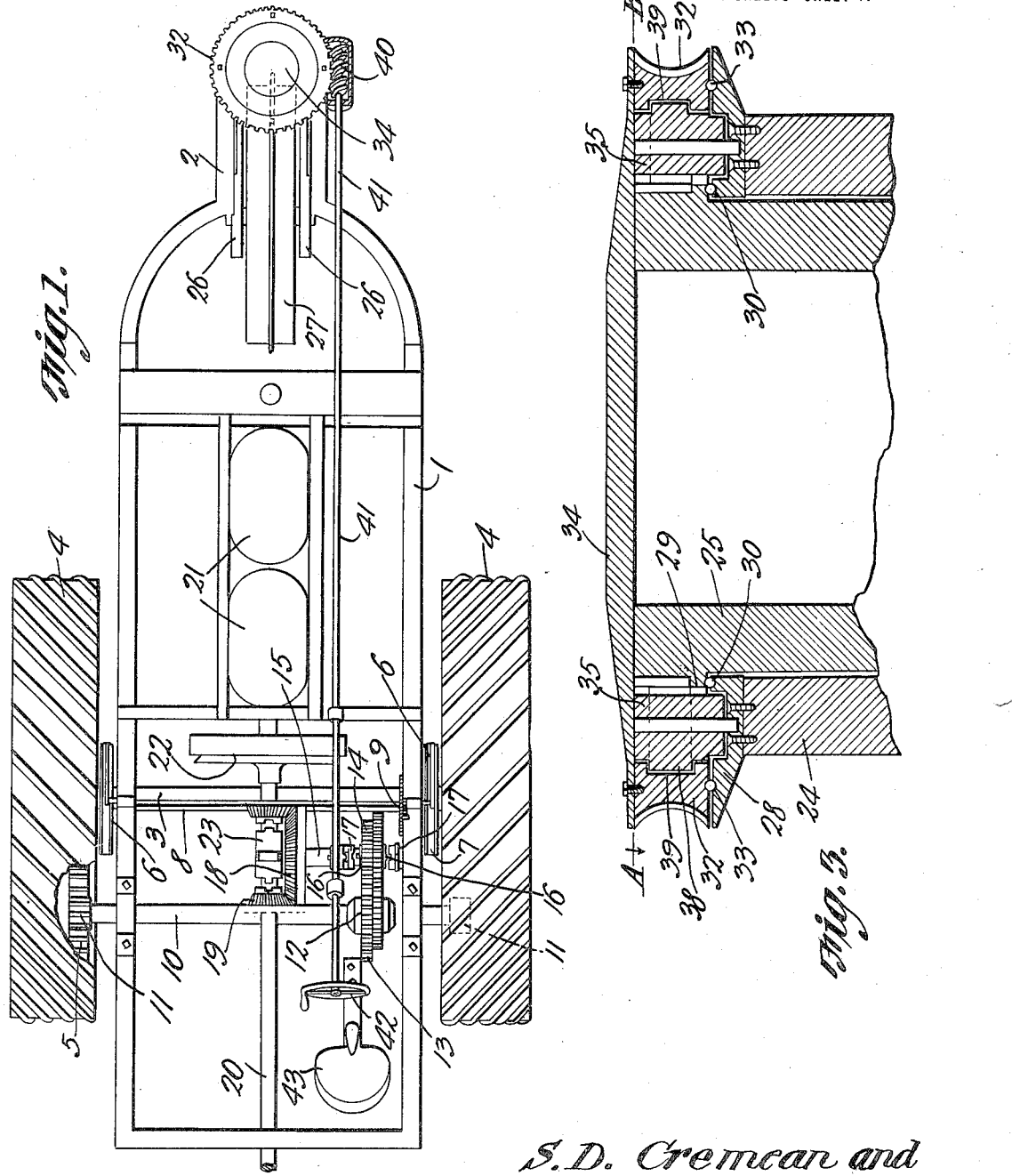

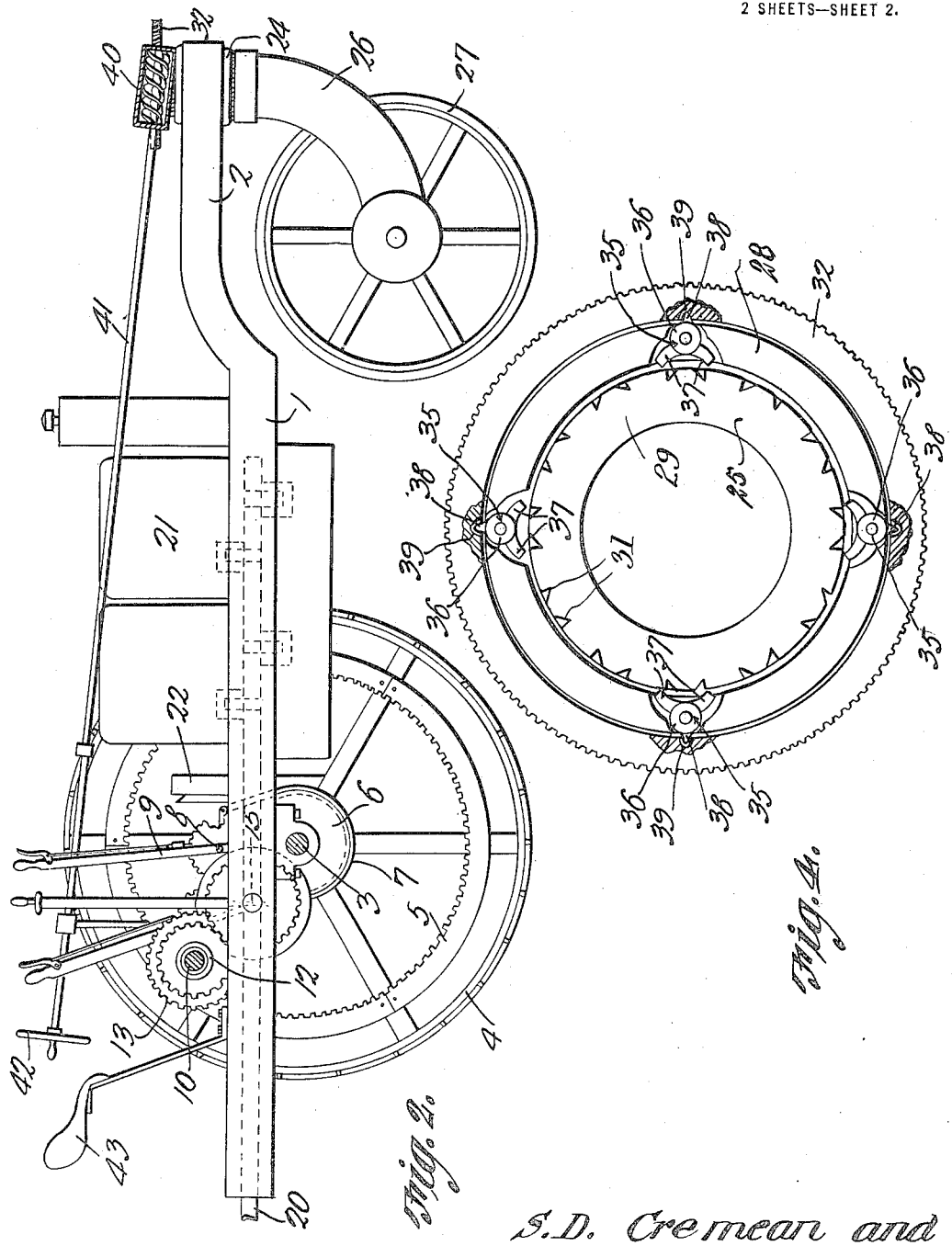

STEVEN D. CREMEAN, OF NEWNAN, AND JOHN T. JONES, OF MADRAS, GEORGIA.

TRACTOR.

1,179,900.        Specification of Letters Patent.        Patented Apr. 18, 1916.

Application filed August 2, 1915. Serial No. 43,216.

*To all whom it may concern:*

Be it known that we, STEVEN D. CREMEAN and JOHN T. JONES, citizens of the United States, residing, respectively, at Newnan and Madras, in the county of Coweta, State of Georgia, have invented a new and useful Tractor, of which the following is a specification.

This invention relates to tractors, one of its objects being to provide a structure whereby the tractor can be caused to turn abruptly in either direction, the said tractor being of the three wheel type, the front or steering wheel having novel means whereby it can be turned toward either side for the purpose of steering the tractor or can be released from the steering mechanism so as to swing freely, as during the abrupt turning of the machine.

A further object is to provide steering mechanism of simple construction and which, by the use of a single steering wheel, can be operated to turn the front wheel of the tractor toward the right or toward the left or to release said wheel so that it will operate as an idler or caster.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the tractor, parts being broken away. Fig. 2 is a side elevation, one of the supporting wheels being removed. Fig. 3 is an enlarged vertical longitudinal section through the fork head of the front wheel of the tractor. Fig. 4 is a section on line A—B Fig. 3.

Referring to the figures by characters of reference 1 designates the frame or chassis of the tractor, the same having a reduced forwardly extended portion 2 bent upwardly and forwardly to provide a clearance for a front or steering wheel such as hereinafter referred to.

An axle 3 is connected to and extends transversely of the chassis near the rear end thereof and has main drive wheels 4 loosely mounted thereon, each wheel being provided with an internal gear 5 and with a brake wheel 6. Each brake wheel coöperates with a brake band 7 adapted to be tightened by the rotation of a transverse rod 8 under the control of a lever 9. It is to be understood of course that instead of providing a single lever for controlling the operation of both of the bands 7, the two bands 7 can be separately operated by separate levers so as to thus make it possible to hold one of the wheels 4 against rotation while the other is being driven.

Journaled upon the chassis 1 is a transverse shaft 10 provided at its ends with gears 11 in mesh with the gears 5. Shaft 10 is provided with a differential indicated generally at 12, the gears 13 on this differential being in mesh with separate gears 14 of different diameters and which are loosely mounted on a counter shaft 15. Each of the gears 14 has a clutch member 16 and feathered on shaft 15 are opposed clutch members 17 adapted to be shifted into engagement with the respective clutch members 16, thus to couple either of the gears 14 to the counter shaft 15. Under normal conditions shaft 15 is free to rotate independently of the gears 14.

A gear 18 is secured to the shaft 15 and constantly meshes with opposed gears 19 loosely mounted on a drive shaft 20 extending longitudinally of the machine and adapted to receive motion direct from a motor 21. A clutch 22 is provided for connecting shaft 20 to or disconnecting it from the motor. A clutch member 23 is feathered on the shaft 20 between gears 19 and is adapted to be shifted so as to couple either of the gears 19 to said shaft 20. It will be obvious that by providing gearing such as described, the machine can be driven either forwardly or rearwardly at either of two speeds.

The reduced forward extension 2 of the chassis is provided with a bearing sleeve 24. Mounted for rotation in this sleeve is the cylindrical head 25 of the fork 26 in which is journaled the front or steering wheel 27. A ring 28 is secured upon the sleeve 24 and is overhung by an annular flange 29 on the head 25, there being a series of anti-friction balls 30 interposed between this flange and the ring 28 so as to reduce friction. Head 25 is provided in its flange 29 with ratchet grooves or recesses 31 disposed in pairs, the grooves of each pair being oppositely disposed as shown particularly in Fig. 4 and all of the pairs of grooves being preferably equally spaced.

A worm gear 32, in the form of a ring, is arranged eccentrically about the head 25 and is supported by ring 28, there being anti-friction balls 33 or the like interposed between the rings 28 and 32 for the purpose of reducing friction. A cap 34 is secured upon the gear 32 and extends over head 25. Pivotally mounted upon the ring 28 and between head 25 and gear 32 are preferably four pawls 35. As shown particularly in Fig. 4, each pawl includes a central or hub portion 36 from which extend inwardly diverging fingers 37 and an outwardly extending lug 38. The lug 38 extends loosely through a recess 39 formed in the inner wall of the gear 32, while the fingers 37 are normally spaced from the periphery of the flange 29 on head 25.

The gear 32 is constantly engaged by a worm 40 carried by the forward end of a steering shaft or post 41 suitably mounted upon the tractor and provided at its rear end with a hand wheel 42 or the like by means of which it can be turned readily, this hand wheel being located close to the seat 43 to be occupied by the driver.

As before pointed out, the ends of the fingers 37 are normally spaced from the periphery of the head 25 and, consequently, said head can rotate freely, thus to allow the wheel 27 to trail in any direction. Consequently should one of the wheels 4 of the tractor be held against rotation while the other is being driven, a very abrupt turn of the tractor could be effected, the wheel 27 acting as a caster to trail in any direction in which the tractor may be moved. However, should it be desired to use the wheel 27 for the purpose of controlling the direction of movement of the tractor, it would merely be necessary to rotate the worm 40. This would cause the gear 32 to revolve about the head 25, said gear pulling on the lugs 38 so as to cause the pawls to simultaneously swing so as to press one finger 37 of each pawl against the head 25, whereupon during the continued rotation of the gear 32 and the movement of the pawls therewith, said pawls will become seated within certain of the recesses 31 with the result that the head 25 will be rotated with the gear 32. By reversing the rotation of worm 40 the rotation of gear 32 will be reversed and the pawls will be simultaneously rocked so that the other fingers thereof will engage within certain of the recesses 31 and thus rotate the head 25 in the opposite direction. When gear 32 reaches an intermediate position the two fingers 37 of each pawl will be held out of engagement with head 25, as shown in Fig. 4. Importance is attached to this particular means for steering the vehicle as it permits prompt adjustment of the parts either to allow the front wheel to work freely like a caster or to positively shift said wheel to the right or to the left for the purpose of steering the tractor.

What is claimed is:—

1. In a vehicle, the combination with a steering wheel normally mounted to move freely about a substantially vertical axis, of a steering shaft, and means operated by the rotation of said shaft in either direction for successively coupling the shaft to the steering wheel and turning said wheel.

2. The combination with the steering wheel of a vehicle, said wheel being mounted to swing about an upwardly extending axis, and a head revoluble with the wheel about said axis, of a ring concentric with the head, means for rotating the ring in either direction, and means operated by the rotation of said ring relative to the head and in either direction, for coupling the ring to the head to turn the wheel toward either side.

3. In a vehicle, the combination with a caster wheel adapted normally to trail, and a head movable about an upwardly extending axis with said wheel, of a ring concentric with the head and normally uncoupled therefrom, means for rotating the ring in either direction, and means operated by the rotation of the ring in either direction for coupling said ring to the head.

4. In a vehicle, the combination with a caster wheel normally adapted to trail, and a head movable with said wheel about an upwardly extending axis, of a ring concentric with the head, a pawl interposed between the head and ring and having oppositely extending fingers normally disengaged from the head, means outstanding from the pawl and engaged by the ring, and means for rotating the ring in either direction to swing the pawl and position one of its fingers in engagement with the head.

5. In a vehicle, the combination with a caster wheel adapted normally to trail, and a head movable with the wheel about an upwardly extending axis, of a ring concentric with the head, spaced pawls interposed between the ring and head and having outstanding portions engaging the ring, each pawl having inwardly diverging fingers normally spaced from the head, and means for rotating the ring in either direction to simultaneously swing the pawls to shift one finger of each pawl into engagement with the head and couple the head to the ring.

In testimony that we claim the foregoing as our own, we have hereto affixed our signatures in the presence of two witnesses.

STEVEN D. CREMEAN.
JOHN T. JONES.

Witnesses:
R. B. ASKEW,
J. R. WISE.